(12) United States Patent
Takahashi et al.

(10) Patent No.: US 8,660,403 B2
(45) Date of Patent: Feb. 25, 2014

(54) CONTENT CONTINUOUS-REPRODUCTION DEVICE, REPRODUCTION METHOD THEREOF, AND REPRODUCTION CONTROL PROGRAM THEREOF

(75) Inventors: Yosuke Takahashi, Akishima (JP); Kenji Odaka, Fuchu (JP); Masashi Tsuji, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 13/191,145

(22) Filed: Jul. 26, 2011

(65) Prior Publication Data

US 2012/0155828 A1 Jun. 21, 2012

(30) Foreign Application Priority Data

Dec. 21, 2010 (JP) ................................ 2010-284750

(51) Int. Cl.
*H04N 9/80* (2006.01)
(52) U.S. Cl.
USPC ......................................................... 386/241
(58) Field of Classification Search
None
See application file for complete search history.

(56) References Cited

U.S. PATENT DOCUMENTS

| | | | |
|---|---|---|---|
| 2002/0011988 A1* | 1/2002 | Sai et al. ...................... | 345/156 |
| 2004/0221310 A1* | 11/2004 | Herrington et al. ............. | 725/46 |
| 2006/0098955 A1* | 5/2006 | Nakada .......................... | 386/124 |
| 2009/0031357 A1* | 1/2009 | Ko .................................. | 725/50 |
| 2011/0083148 A1* | 4/2011 | Sakaguchi et al. .............. | 725/39 |

FOREIGN PATENT DOCUMENTS

| | | |
|---|---|---|
| JP | 2007-287204 | 1/2007 |
| JP | 2007036830 | 2/2007 |
| JP | 2007150764 | 6/2007 |
| JP | 2008-305495 | 12/2008 |
| JP | 2010-003372 | 1/2010 |

OTHER PUBLICATIONS

Japanese Patent Application No. 2011-284750, Notice of Reasons for Rejection, mailed Oct. 4, 2011, (with English Translation).

* cited by examiner

*Primary Examiner* — Huy T Nguyen
(74) *Attorney, Agent, or Firm* — Blakely, Sokoloff, Taylor & Zafman LLP

(57) ABSTRACT

According to one embodiment, a reproduction device includes a presenter, a repository, and a reproduction controller. The presenter presents a metadata group including a plurality of items of metadata to a first display, allows selection of the metadata from among the metadata group, and receives selected metadata. The repository holds the metadata received by the presenter. The reproduction controller obtains moving image on the basis of the metadata held in the repository, and outputs the moving image to a second display. When the metadata are selected from among the metadata group in the presenter while the is output by the reproduction controller, the presenter outputs the selected metadata to the repository and obtains a metadata group further related to the selected metadata without interrupting the which is output by the reproduction controller, and thereafter presents this obtained result to the first display.

19 Claims, 7 Drawing Sheets

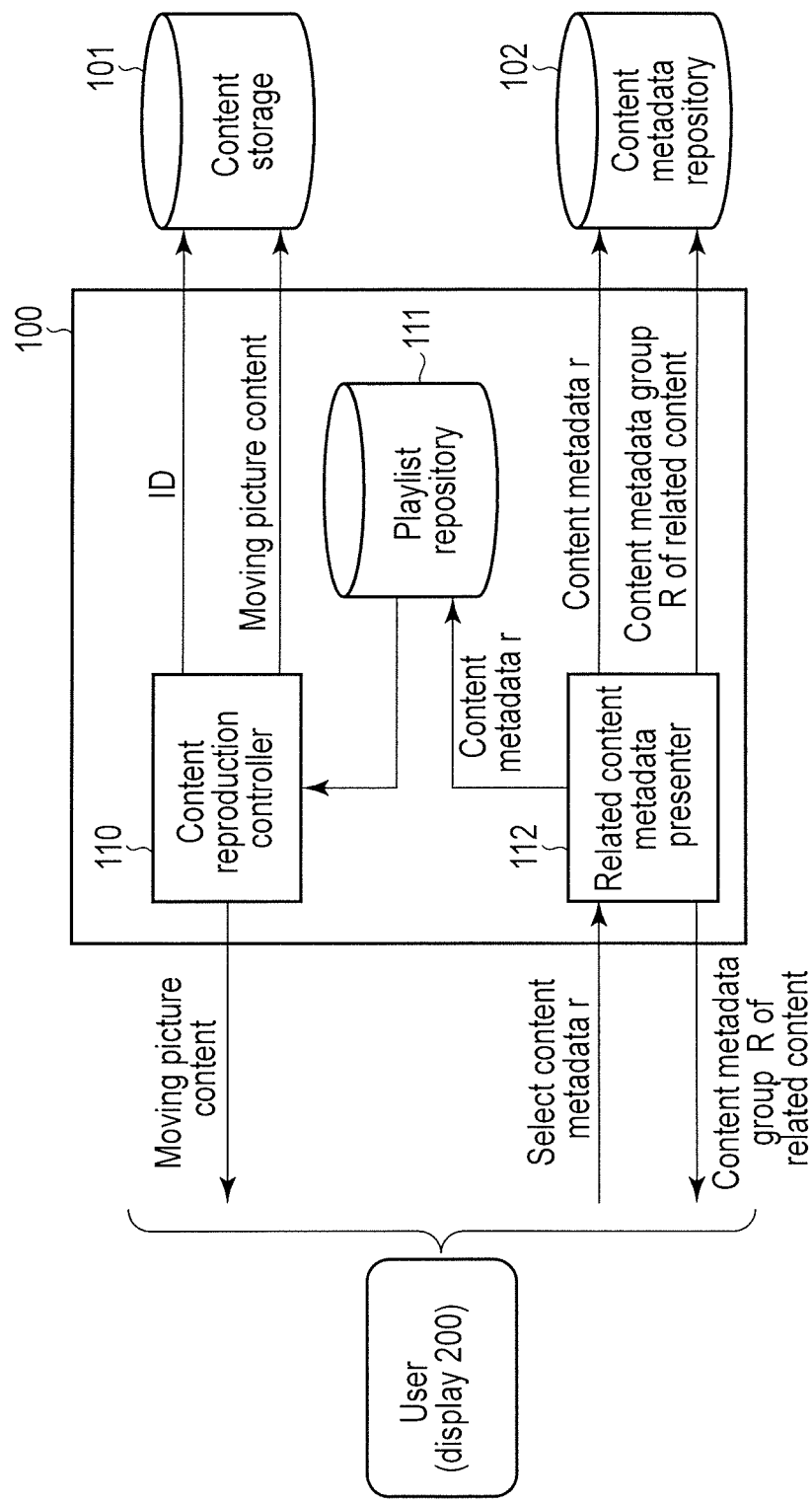
F I G. 1

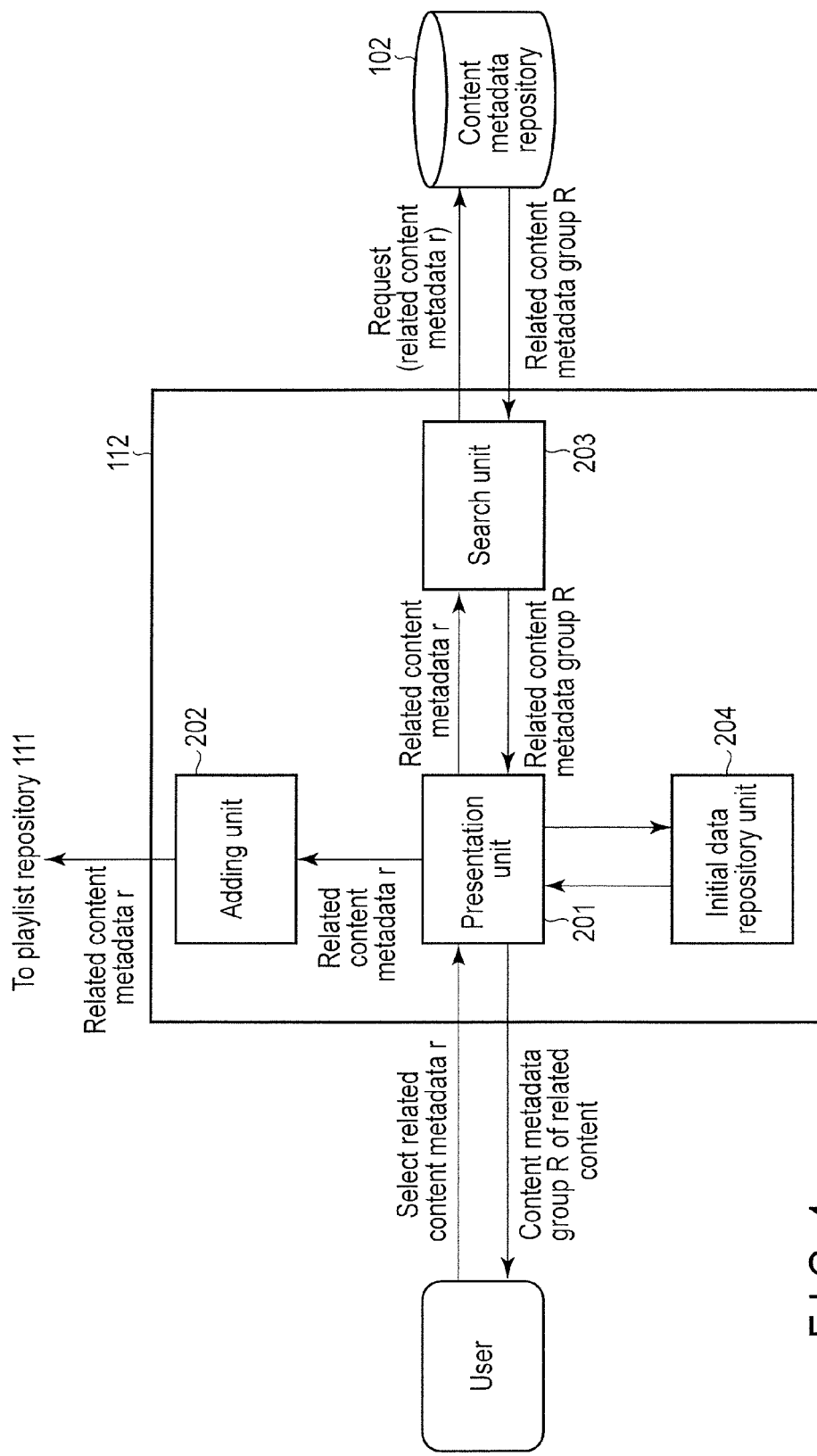
F I G. 4

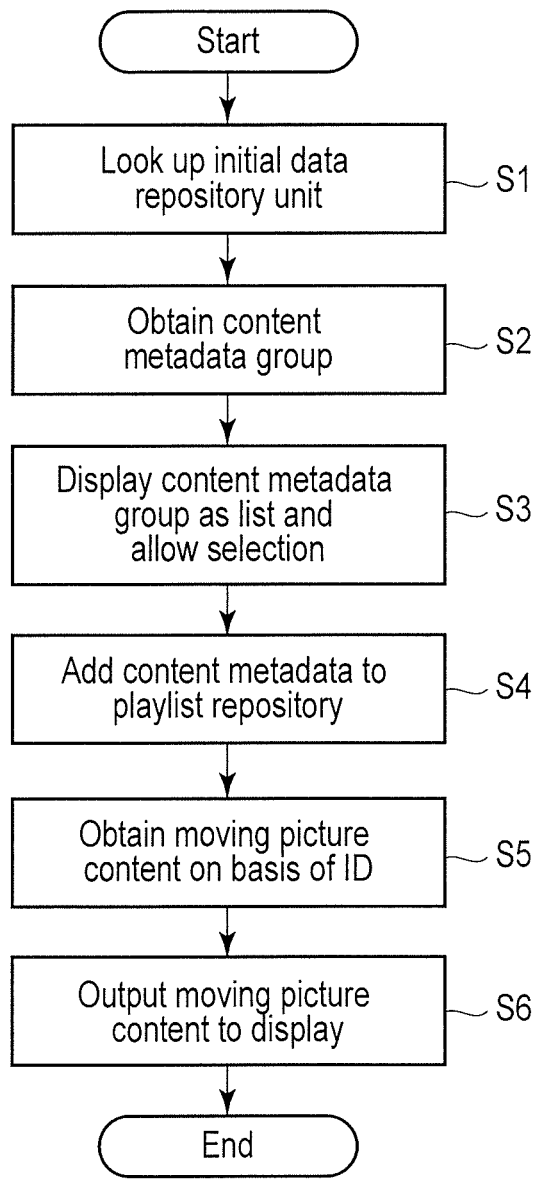
F I G. 5

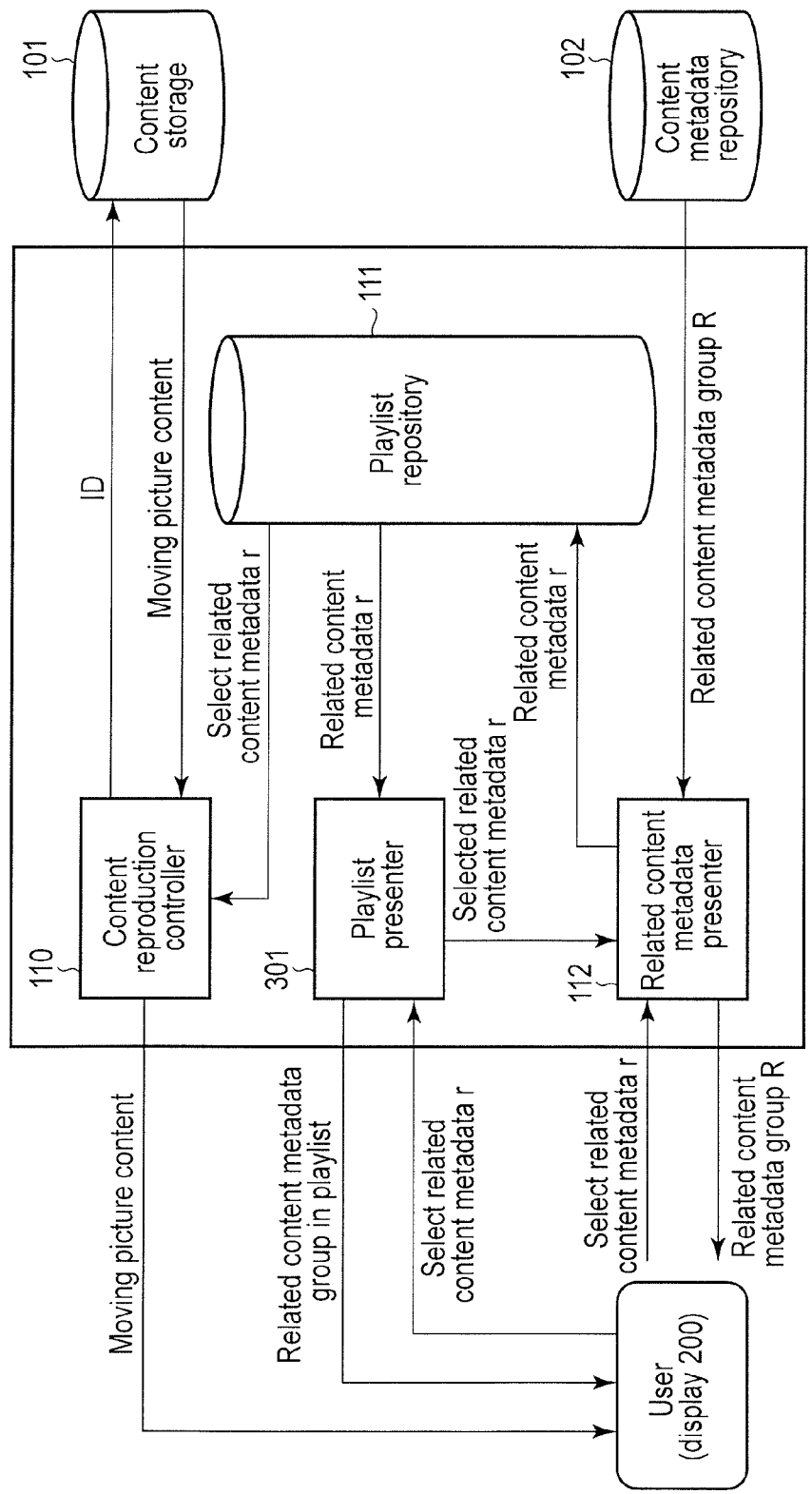
F I G. 7

CONTENT CONTINUOUS-REPRODUCTION DEVICE, REPRODUCTION METHOD THEREOF, AND REPRODUCTION CONTROL PROGRAM THEREOF

CROSS-REFERENCE TO RELATED APPLICATIONS

This application is based upon and claims the benefit of priority from Japanese Patent Application No. 2010-284750, filed Dec. 21, 2010; the entire contents of which are incorporated herein by reference.

FIELD

Embodiments described herein relate generally to a reproduction device capable of reproducing a moving image content while allowing selection and programming of a related moving image content.

BACKGROUND

Recently, an ordinary user may easily record a video and generate an animation, and Internet sites are full of various kinds of moving image contents. For example, when a user views a content having a short viewing time (which may be hereinafter referred to as a short clip content) using a personal computer via the Internet, there is a mode for continuously viewing a plurality of contents in a similar manner to a television receiver.

For example, a major moving image site provides a function for allowing a user to generate a playlist by selecting a plurality of contents in advance to continuously reproduce the contents. Related contents are used as means for searching for an interesting content from among many contents, and by following related contents, a user may discover a content that has not been discovered until then from a field of contents preferred by the user.

Further, the major moving image site has a function of allowing a user to select and reproduce contents by displaying related contents related to a reproduced content, such as "suggestions" and "recommendations".

In this mode, however, when a user selects a related content, the currently reproduced content is stopped. Therefore, when a user wants to subsequently reproduce the related content, it is necessary for the user to select a related content every time a reproduction is finished.

In this case, if a function is provided to generate a playlist in advance by searching for contents by following related contents without reproducing any moving image content, the selected contents may be reproduced continuously.

However, it takes much time to do this operation, and moreover, the user is required to be engaged in this operation during this operation. Thus, it is very inconvenient for the user to generate a long playlist. If only a short playlist is generated, it takes only a short time to finish reproducing the playlist including short clip contents, and the user has to generate a playlist again.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a schematic diagram illustrating a content continuous-reproduction device according to a first embodiment;

FIG. 4 is a schematic diagram illustrating the content metadata presenter according to the first embodiment;

FIG. 5 is a flowchart illustrating operation of the content continuous-reproduction device according to the first embodiment;

FIG. 7 is a schematic diagram illustrating a content continuous-reproduction device according to a second embodiment.

DETAILED DESCRIPTION

Various embodiments will be described hereinafter with reference to the accompanying drawings.

Embodiments will be hereinafter explained with reference to the drawings. In this explanation, the same portions are denoted by the same reference numbers throughout the drawings.

In general, according to one embodiment, a reproduction device includes a presenter, a repository, and a reproduction controller. The presenter presents a content metadata group including a plurality of items of content metadata to a first display, allows selection of the content metadata from among the content metadata group, and receives selected content metadata. The repository holds the content metadata received by the presenter. The reproduction controller obtains a moving image content on the basis of the content metadata held in the repository, and outputs the moving image content to a second display. When the content metadata are selected from among the content metadata group in the presenter while the content is output by the reproduction controller, the presenter outputs the selected content metadata to the repository and obtains a content metadata group further related to the selected content metadata without interrupting the content which is output by the reproduction controller, and thereafter presents this obtained result to the first display.

First Embodiment

Figure 2:
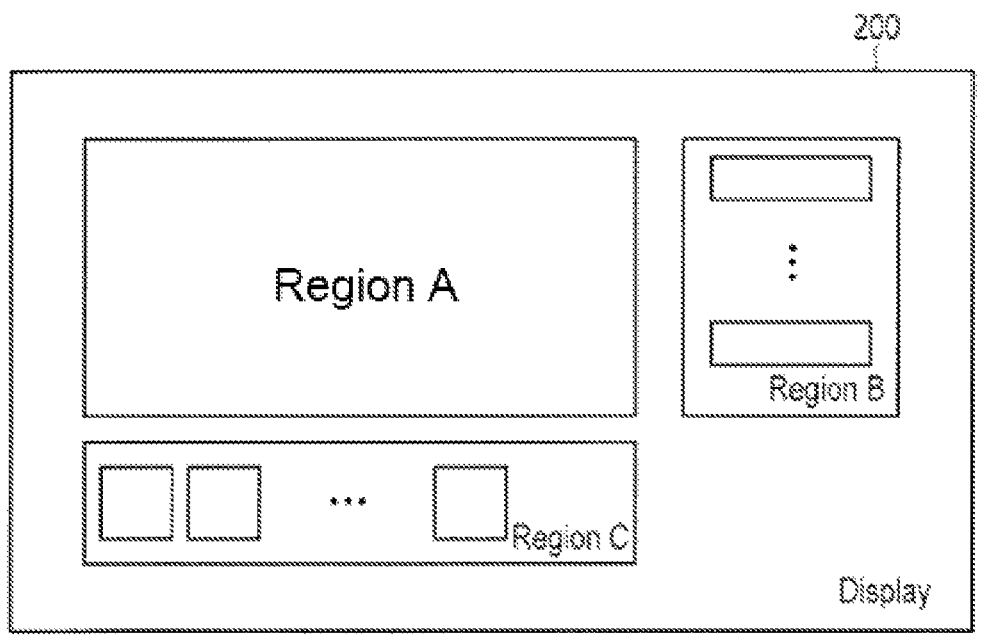
FIG. 2 is a schematic diagram illustrating a display according to the first embodiment.

A content continuous-reproduction device according to the first embodiment will be hereinafter explained with reference to FIGS. 1 and 2. FIG. 1 is a schematic diagram illustrating a reproduction device for reproducing a moving image content, extracting (searching for) a plurality of content metadata (hereinafter referred to as content metadata group) related to the reproduced moving image content, and displaying the content metadata group thus extracted on a display as a list. Hereinafter, the reproduction device shown in FIG. 1 is referred to as a content continuous-reproduction device 100. This content continuous-reproduction device 100 is included in a personal computer, for example. FIG. 2 is a schematic diagram illustrating a display 200 for displaying a related content metadata group and moving image contents which are output by the content continuous-reproduction device 100. In the present embodiment, the content means digital information that may be reproduced by a computer and the like, and the moving image content means digital information which a user may view and which requires a certain period of time when the user views the moving image content. The content metadata mean information such as an ID serving as an identifier corresponding thereto, a title of a moving image, a summary, a thumbnail of the moving image, a part of the moving image (one scene). The related content metadata mean content metadata related to the moving image content actually reproduced. In other words, the related content metadata mean content metadata which are determined to be related to the actually reproduced moving image content by a predetermined evaluation method. More specifically, "relation" includes the following contents.

Belonging to the same field (category) as the reproduced moving image content.

Being made by the same author as the author of the reproduced moving image content.

Including the same keyword as that of the reproduced moving image content.

A service providing moving image contents uses a unique algorithm to present contents as being related, similar, or recommended with respect to the reproduced moving image content.

As shown in FIG. 1, the content continuous-reproduction device 100 is capable of exchanging data with a content storage 101 and a content metadata repository 102 which are provided externally, i.e., in a server, via, for example, a telecommunications line, and the content continuous-reproduction device 100 displays the obtained moving image content and the obtained related content metadata on the display 200. The content continuous-reproduction device 100 includes a content reproduction controller 110, a playlist repository 111 made of, for example, a hard disk and a RAM, and a related content metadata presenter 112.

As shown in FIG. 2, a plurality of regions A, B, and C are provided on the screen of the display 200. In these regions A, B, and C, predetermined moving images, images, and the like are displayed. For example, the moving image content is displayed in region A. For example, the related content metadata are displayed in region B. Further, selected related content metadata of the related content metadata displayed in region B are displayed in region C.

The content continuous-reproduction device 100 will be hereinafter explained with reference to FIG. 1. The content reproduction controller 110 obtains a moving image content on the basis of the related content metadata stored in the playlist repository 111, and outputs the obtained moving image content to the display 200. More specifically, when the output of the moving image content is finished, the content reproduction controller 110 refers the playlist repository 111 to determine whether there are related content metadata. When there is a moving image content to be subsequently reproduced, the content reproduction controller 110 obtains a moving image content from the content storage 101 via, for example, a telecommunications line on the basis of the ID attached to the related content metadata stored in the playlist repository 111, and reproduces the moving image content. Accordingly, even when related content metadata are successively added to the playlist repository 111, the moving image contents are reproduced one by one without interrupting the reproduction of the moving image. As described above, when the content reproduction controller 110 outputs the moving image content, the moving image content is displayed in region A of the display 200 as shown in FIG. 2. This moving image content is stored in the content storage 101. The content reproduction controller 110 refers the playlist repository 111 to determine whether there are related content metadata. A result of the referring, when it is determined that there is no moving image content to be subsequently reproduced, the content reproduction controller 110 waits for a certain period of time and then refers the playlist repository 111 again to determine whether there are related content metadata.

The playlist repository 111 stores the related content metadata provided by the related content metadata presenter 112. The playlist repository 111 may store one item of related content metadata or a plurality of items of related content metadata. The playlist repository 111 successively provides the stored related content metadata to the content reproduction controller 110 in accordance with the response given by the content reproduction controller 110. The related content metadata stored in the playlist repository 111 may be displayed on the display 200. In this case, the related content metadata are displayed in region C on the display 200 as shown in FIG. 2. For example, this region C is provided below region A. The way of display is not particularly limited, and only thumbnails and titles of the related content metadata may be displayed instead.

The related content metadata presenter 112 obtains related content metadata group (denoted by R in the figure, where R is a set of $r_1$ to $r_n$ and n is a natural number) from the content metadata repository 102 connected via, for example, a telecommunications line, and presents (displays) the related content metadata group in region B of the display 200 as a list as shown in FIG. 2. This will be hereinafter referred to as related content metadata group R. When the related content metadata presenter 112 outputs related content metadata group R, the related content metadata group R is displayed on the display 200 as a list. When one of related content metadata $r_1$ to $r_n$ constituting related content metadata group R is selected (simply denoted by r in the figure), the related content metadata presenter 112 provides the selected related content metadata r to the playlist repository 111. When related content metadata $r_1$ to $r_n$ are not distinguished, they are simply referred to as related content metadata r.

Related content metadata group R that the related content metadata presenter 112 obtains from the content metadata repository 102 when the content continuous-reproduction device 100 is activated is information according to an initial setting explained later.

Related content metadata group R obtained in the second and subsequent retrievals refers to a related content metadata group R related to related content metadata r displayed in region B as a list and selected by a user. In other words, it is a related content metadata group R which is related to the moving image content held in the playlist repository 111 and thereafter reproduced in region A. Hereinafter, the detailed configuration of the related content metadata presenter 112 will be explained.

<Example of Detailed Configuration of Related Content Metadata Presenter 112>

An example of detailed configuration of the related content metadata presenter 112 will be explained with reference to FIGS. 3 and 4. First, the example of the detailed configuration of the related content metadata presenter 112 will be explained with reference to FIG. 3.

Figure 3:
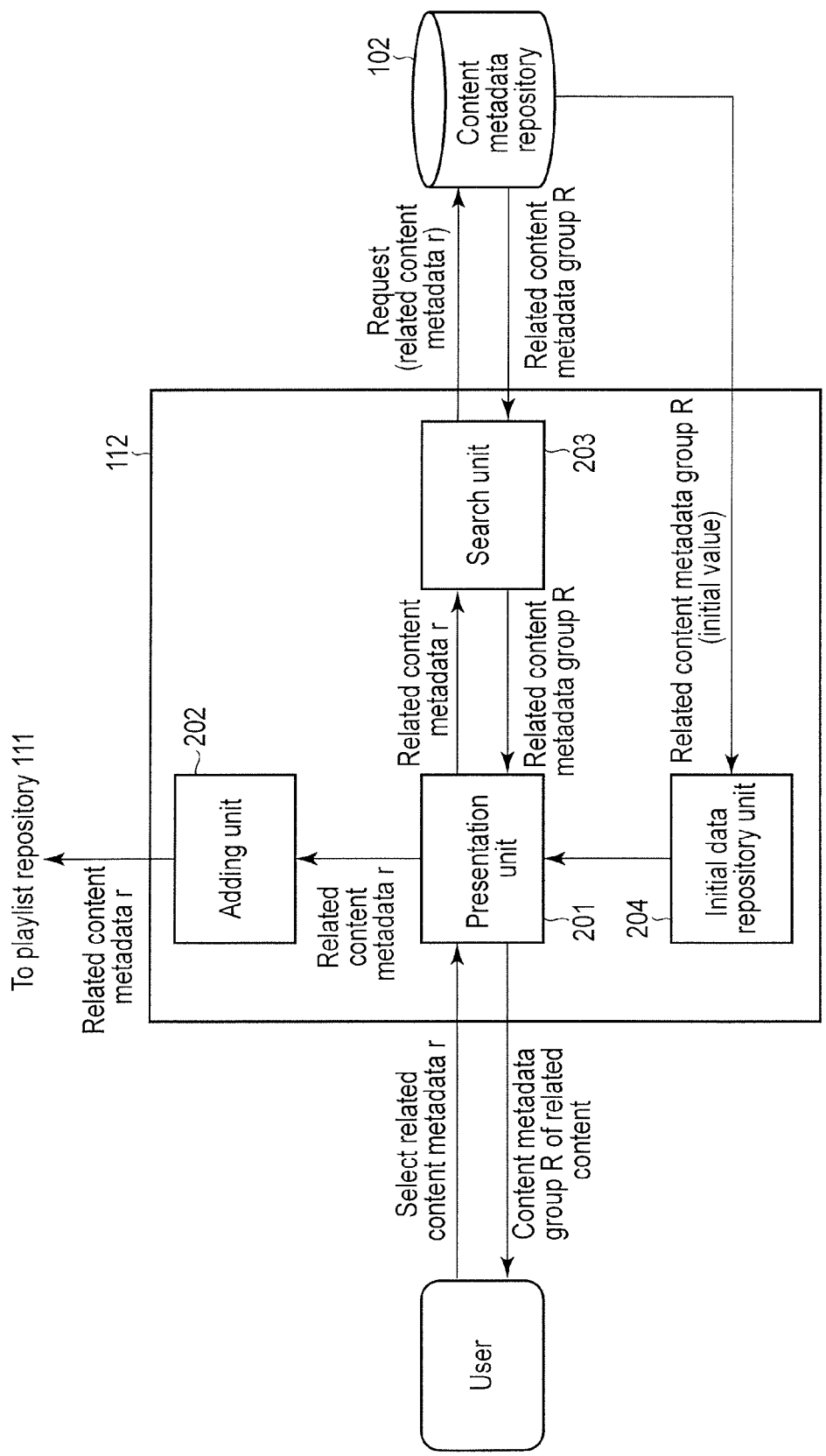
FIG. 3 is a schematic diagram illustrating a content metadata presenter according to the first embodiment.

As shown in FIG. 3, the related content metadata presenter 112 includes a presentation unit 201, an adding unit 202, a search unit 203, and an initial data obtaining unit 204.

When the content continuous-reproduction device 100 is turned on, the presentation unit 201 detects this activation, and refers the initial data obtaining unit 204. Subsequently, the presentation unit 201 obtains related content metadata group R stored in the initial data obtaining unit 204 and thereafter presents the obtained result to region B of the display 200. When related content metadata r are selected from among related content metadata group R presented on the display 200 based on the data stored in the initial data obtaining unit 204, the presentation unit 201 controls the search unit 203 to search for a related content metadata group R related to the selected related content metadata r.

Further, the presentation unit 201 presents the search result provided by the search unit 203, i.e., the obtained related content metadata group R, in region B of the display 200 as a list. The presentation unit 201 also provides the adding unit 202 with related content metadata r selected from among related content metadata group R shown in region B as the list.

Further, the presentation unit 201 controls the search unit 203 to search for a related content metadata group R further related to related content metadata r provided to the adding unit 202.

When the search unit 203 receives a command for searching for related content metadata group R from the presentation unit 201, the search unit 203 transmits a request to the content metadata repository 102 on the basis of this command. When the search unit 203 receives a request result from the content metadata repository 102 via, for example, a telecommunications line, or, in other words, when the search unit 203 receives a related content metadata group R from the content metadata repository 102, the search unit 203 provides it to the presentation unit 201.

The adding unit 202 provides related content metadata r given by the presentation unit 201 to the playlist repository 111.

The initial data obtaining unit 204 stores initial values and the like which allow search of content metadata r of popular contents frequently viewed by users and recently added content metadata r in the content metadata group R stored in the content metadata repository 102. The initial data obtaining unit 204 may store not only the initial value but also content metadata r of contents that have been viewed in the past.

Alternatively, the initial data obtaining unit 204 may store only the content metadata r that have been viewed in the past. In this case, the initial data obtaining unit 204 is referred to as an initial data repository unit 204. This situation is shown in FIG. 4.

Like FIG. 3, FIG. 4 is another example of the detailed configuration of the related content metadata presenter 112. In FIG. 4, the initial data repository unit 204 stores related content metadata r selected from among related content metadata group R presented in region B by the presentation unit 201 on every occasion. In other words, every time related content metadata r is selected, related content metadata r are stored. In other words, the initial data obtaining unit 204 stores up a viewing history. Therefore, related content metadata group R may be swiftly referred without using any telecommunications line.

The presentation unit 201 refers the initial data repository unit 204. Subsequently, the presentation unit 201 presents the viewing history, obtained as a result of the above reference, in region B of the display 200 as a related content metadata group R, and allows selection of a related content metadata group R. The configuration other than the above is the same as that of FIG. 3, and explanation thereof is omitted.

<Operation of Content Continuous-Reproduction Device>

Subsequently, operation of the content continuous-reproduction device 100 explained above will be explained with reference to FIG. 5.

First, when the content continuous-reproduction device 100 is activated, the content metadata presenter 112 refers the initial data obtaining unit 204 (step S1). The content metadata presenter 112 obtains a related content metadata group R from the content metadata repository 102 via, for example, a telecommunications line, on the basis of data stored in the initial data obtaining unit 204 (S2).

Subsequently, related content metadata group R obtained in step S2 is displayed in region B on the display 200 as a list, and the related content metadata presenter 112 allows selection of related content metadata group R displayed as the list (S3).

Thereafter, when a related content metadata r is selected from among related content metadata group R, the related content metadata presenter 112 adds the selected related content metadata r to the playlist repository 111 (S4).

The content reproduction controller 110 refers the playlist repository 111 as to whether related content metadata r are added. When this addition is detected as a result of the reference, the content reproduction controller 110 obtains the moving image content from the content storage 101 via, for example, a telecommunications line, on the basis of the ID attached to related content metadata r (S5).

Thereafter, the moving image content obtained in step S5 is output, whereby the moving image content is displayed in region A of the display 200 (S6).

<Operation of Related Content Metadata Presenter>

Figure 6:
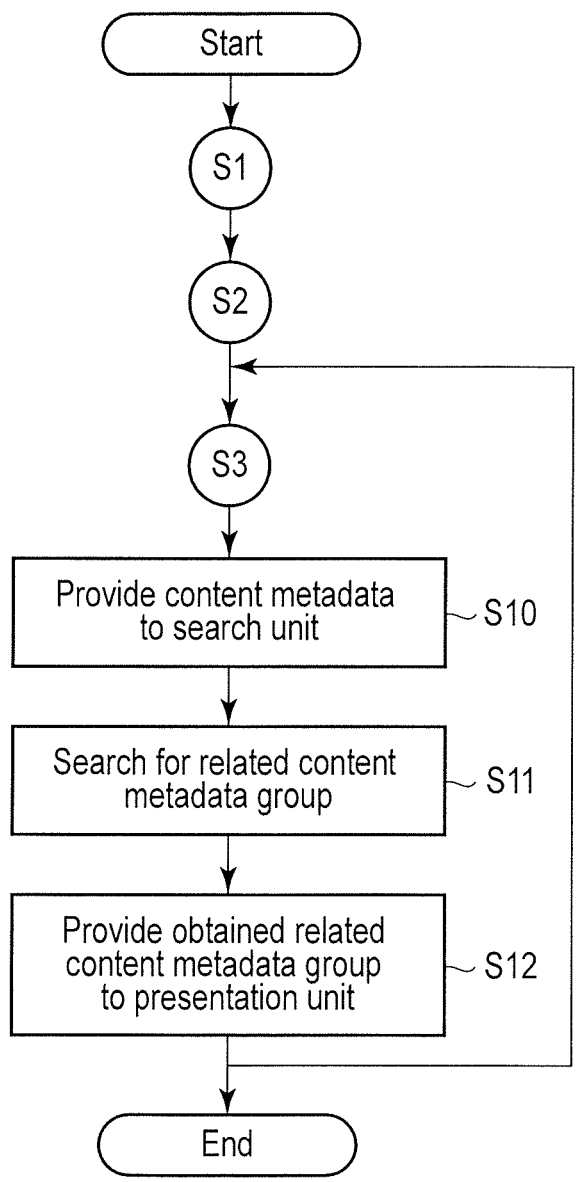
FIG. 6 is a flowchart illustrating operation of the content metadata presenter according to the first embodiment.

Subsequently, another operation of the related content metadata presenter 112 will be explained with reference to FIG. 6. FIG. 6 is a flowchart illustrating operation of the related content metadata presenter 112 when a user selects one item of related content metadata r from among the content metadata group R presented in region B.

After steps S1 to S3, when one item of related content metadata r is selected from related content metadata group R, the presentation unit 201 outputs the selected related content metadata r to the search unit 203 (S10). Subsequently, the search unit 203 searches the content metadata repository 102 via, for example, a telecommunications line for a related content metadata group R' further related thereto, on the basis of the provided related content metadata r (S11). As a result of step S11, when related content metadata group R' is obtained, the search unit 203 provides related content metadata group R' to the presentation unit 201 (S12). In other words, the presentation unit 201 outputs the provided related content metadata group R' to the display 200. Therefore, a new list of related content metadata group R' is displayed in region B on the display 200, and selection of related content metadata group R' is enabled. In other words, operation of step S3 is subsequently performed. When the computer is turned off, or the content continuous-reproduction device 100 is halted, the flowchart of FIG. 6 is halted.

<Effects Obtained from Present Embodiment>

According to the content continuous-reproduction device of the present embodiment, related content metadata may be programmed in the playlist without interrupting the reproduction of the operation content.

In other words, the content continuous-reproduction device according to the present embodiment includes the configuration for reproducing a moving image content according to the data stored in the playlist repository 111 and the configuration for adding content metadata to the playlist repository 111.

More specifically, as described above, the content reproduction controller 110 for reproducing a moving image content according to the playlist repository 111 and the related content metadata presenter 112 for adding related content metadata to the playlist repository 111 are provided, wherein the content reproduction controller 110 configured to mainly reproduce the moving image content and the related content metadata presenter 112 for adding and programming related content metadata r selected by searching for related content metadata group R related to the moving image content reproduced by the content reproduction controller 110 are independently provided.

In this configuration, even when a related content metadata r corresponding to a moving image content is added to the playlist repository 111 on every occasion, the content reproduction controller 110 may keep on reproducing the moving image content without any interruption.

Therefore, this solves the following disadvantage associated with the major moving image site. In the major moving image site, when moving image content (thumbnail) is selected while another moving image content is reproduced, the currently reproduced moving image content is interrupted, and the newly selected moving image content is reproduced.

Second Embodiment

Subsequently, a content continuous-reproduction device 100 according to the second embodiment will be explained with reference to FIG. 7. In the present embodiment, a playlist presenter 301 is additionally provided in the content continuous-reproduction device 100 according to the first embodiment. The same portions as those of the first embodiment are denoted by the same reference numbers, and description thereof is omitted.

In FIG. 7, the playlist presenter 301 allows selection of related content metadata r displayed on a display 200 on the basis of related content metadata r stored in a playlist repository 111. When one of a plurality of items of related content metadata r displayed as a list by the playlist presenter 301 is selected, the playlist presenter 301 provides the selected related content metadata r to a related content metadata presenter 112.

When the selected related content metadata r is provided from the playlist presenter 301, the related content metadata presenter 112 obtains a related content metadata group R further related to related content metadata r from a content metadata repository 102 via, for example, a telecommunications line, and outputs the obtained related content metadata group R to region B of the display 200. As a result, related content metadata group R is displayed in region B of the display 200 as a list, and a user may select related content metadata group R.

<Effects Obtained from Present Embodiment>

In the second embodiment, the same effects as those provided by the first embodiment may be obtained. Further, in the second embodiment, content metadata related to the content metadata already added to the playlist may be displayed and selected.

In general, when a moving image content (thumbnail) related to a reproduced moving image content is selected while the moving image content is reproduced in the major moving image site, the currently reproduced moving image content is interrupted, and the newly selected moving image content is reproduced, and a list of content metadata related to the currently reproduced moving image content disappears from a screen. In other words, a list of content metadata related to the newly selected moving image content is displayed. If a user views a list of content metadata related to the currently reproduced moving image content again, it is necessary to interrupt the currently reproduced moving image content and go back to a previous page, and the user may still feel inconvenience.

In contrast, in the present embodiment, the playlist presenter 301 presenting a list of a plurality of items of related content metadata r stored in the playlist repository 111 is provided, and the playlist presenter 301 provides the plurality of items of selected related content metadata r to the related content metadata presenter 112. In this configuration, related content metadata r further related to related content metadata r presented by the playlist presenter 111 may be displayed on the display 200 again.

In other words, related content metadata r displayed on the display 200 as the list, i.e., related content metadata r stored in the playlist repository 111, may be selected, so that related content metadata group R related to the selected related content metadata r may be displayed again on the display 200 as the list without interrupting the moving image content, and it may be added to the playlist repository 111 as necessary.

Therefore, while a user views the moving image content, a related content metadata group once displayed in the past but not selected at that occasion may be displayed, and related content metadata r may be selected from among the related content metadata group. As a result, this saves the user from storing related content metadata r to the playlist repository 111, and many related content metadata r may be added to the playlist repository 111.

It should be noted that, as the user views related moving image contents, related content metadata r already viewed may be displayed among related content metadata group R in region B. In order to prevent already viewed contents from appearing, related content metadata r once selected may not be displayed again in region B in the first and second embodiments. In other words, for example, when the related content metadata presenter 112 holds information about related content metadata r selected by a user in step S4 shown in FIG. 5, and related content metadata r thus held is included in related content metadata group R obtained from the content metadata repository 102 in step S2, the related content metadata presenter 112 deletes this related content metadata r, or removes this from related content metadata group R that is output to the display 200 in step S6, whereby it is possible to prevent related content metadata r once selected from being displayed in region B again.

Alternatively, the playlist repository 111 may store the information about related content metadata r selected by the user.

In the first and second embodiments, when the content continuous-reproduction device 100 is turned on, the related content metadata presenter 112 refers the initial data obtaining unit 204, and obtains related content metadata group R related thereto from the content metadata repository 102. Alternatively, for example, a function for allowing a user to search for content metadata of a moving image content that the user wants to view may be added. In this case, the search unit 203 directly accepts search from an external source.

On the other hand, related content metadata group R displayed in region B may be a related content metadata group R related to a moving image content searched by a user.

In the first and second embodiments, data are obtained by accessing the content metadata repository 102 via a telecommunications line. However, data may be obtained in other ways. For example, the related content metadata presenter 112 may respectively store related content metadata r viewed until then and caches of related content metadata group R associated therewith. If related content metadata r stored in the cache is selected and added to the playlist repository 111, the presentation unit 201 may refer the cache, and display a related content metadata group related to related content metadata r added to the playlist repository 111 in region B. This enables swift access.

The content storage 101 and the content metadata repository 102 are provided in the content continuous-reproduction device 100. In this case, the related content metadata presenter 112 and the content reproduction controller 110 respectively exchange data such as related content metadata r and moving image contents using, for example, a data bus (not shown) without using any telecommunications line.

In the first and second embodiments, a CPU (central processing unit) provided in a personal computer may function as the content reproduction controller 110, the related content metadata presenter 112, and the playlist presenter 301.

Further, the initial data obtaining unit (initial data repository unit) 204 may store related content metadata r finally received by the related content metadata presenter 112 when the content continuous-reproduction device 100 is previously turned on (during operation previous to the current operation), and may store a content metadata group R related to related content metadata r finally received. Alternatively, it may be related content metadata r stored by the playlist repository 111 immediately before the content continuous-reproduction device 100 is turned off. Still alternatively, it may be a collection of related content metadata r received by the presentation unit 201 from when the content continuous-reproduction device 100 is turned on to when it is turned off.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reproduction device comprising:
   a first presenter configured to display a first content metadata group including metadata of a plurality of contents in a first display area, wherein metadata of a first content is selected from the first content metadata group;
   a reproduction controller configured to reproduce the first content if the metadata of the first content is selected,
   wherein the first presenter is configured to display a second content metadata group including metadata of a plurality of contents related to the first content while the reproduction controller reproduces the first content, and
   if metadata of a second content is selected from the second content metadata group while the reproduction controller reproduces the first content, the first presenter is configured to display a third content metadata group including metadata of a plurality of contents related to the second content while the reproduction controller reproduces the first content.

2. The device of claim 1, further comprising:
   a storage configured to accumulate selected metadata;
   a second presenter configured to display the accumulated metadata in a second display area.

3. The device of claim 2, wherein the reproduction controller is configured to read one of the metadata from the storage and to reproduce a content based on the read metadata.

4. The device of claim 2, wherein the first presenter comprises:
   a search unit configured to search the second content metadata group;
   a presentation unit configured to display a result of the search in the first display area; and
   an adding unit configured to add, to the storage, metadata corresponding to a result of the search.

5. The device of claim 1, wherein the metadata is stored in a storage device connected with the first presenter via a data bus or in a server connectable with the first presenter via a telecommunications line, and
   the content is stored in a storage device connected with the reproduction controller via a data bus or in a server connectable with the reproduction controller via a telecommunications line.

6. The device of claim 1, wherein
   the first presenter comprises an initial data obtaining unit configured to obtain the first content metadata group according to an initial value, and
   the first presenter is configured to refer the initial data obtaining unit, and display the obtained first content metadata group in the first display area.

7. The device of claim 4, wherein the first presenter comprises an initial data obtaining unit configured to obtain the first content metadata group to be displayed in the first display area as an initial value at booting,
   every time the presentation unit receives metadata corresponding to the result of search, the initial data obtaining unit is configured to store the received metadata as the initial value, and
   the first presenter is configured to display the initial value, stored in the initial data obtaining unit at the booting, in the first display area as the content metadata group.

8. The device of claim 2, wherein when the reproduction controller detects that output of the content is finished, the reproduction controller is configured to refer the metadata stored in the storage to be subsequently output, and display the content based on the metadata stored in the storage, and
   when, the storage does not store the metadata, the reproduction controller waits for a certain period of time and refers the storage.

9. The device of claim 1, wherein the first presenter comprises an initial data obtaining unit configured to obtain the content metadata group according to an initial value, wherein
   the initial value comprises a value for obtaining metadata frequently viewed or a value for obtaining metadata recently added in the second content metadata group, and
   the first presenter is configured to refer the initial data obtaining unit, and display the first content metadata group obtained by the initial data obtaining unit in the first display area.

10. The device of claim 1, wherein the first presenter comprises an initial data obtaining unit configured to store an initial value of the first content metadata group presented in the first display area at booting,
    wherein the initial value of the first content metadata group comprises a content metadata group related to the first content metadata finally received by the first presenter at a previous booting.

11. A contents reproduction method comprising:
    displaying a first content metadata group including metadata of a plurality of contents in a first display area;
    selecting metadata of a first content from the first content metadata group; and
    reproducing the first content if the metadata of the first content is selected,
    wherein a second content metadata group including metadata of a plurality of contents related to the first content is displayed while the first content is reproduced, and
    if metadata of a second content from the second content metadata group is selected while the first content is reproduced, a third content metadata group including metadata of a plurality of contents related to the second content is displayed while the first content is reproduced.

12. The method of claim 11, wherein
the first content metadata group comprises metadata frequently viewed or metadata recently added in the second content metadata group.

13. The method of claim 11, wherein the metadata comprises a corresponding ID.

14. The method of claim 11, wherein the content metadata group comprises an ID, a title, a summary, a thumbnail, and a portion of the metadata.

15. A non-transitory computer-readable storage medium storing computer-readable instructions that, when executed, cause a computer to:
display a first content metadata group including metadata of a plurality of contents in a first display area;
select metadata of a first content from the first content metadata group; and
reproduce the first content if the metadata of the first content is selected,
wherein a second content metadata group including metadata of a plurality of contents related to the first content is displayed while the first content is reproduced, and
if metadata of a second content from the second content metadata group is selected while the first content is reproduced, a third content metadata group including metadata of a plurality of contents related to the second content is displayed while the first content is reproduced.

16. The storage medium program of claim 15, further comprising:
display a playlist comprising selected metadata in a second display area.

17. The storage medium of claim 15, wherein when booting is detected, an initial value is referred,
the content metadata group is searched according to the initial value, and
a content metadata group obtained by a search is displayed in the first display area.

18. The method of claim 11, further comprising:
displaying a playlist comprising selected metadata in a second display area.

19. The method of claim 18, further comprising:
displaying, if metadata in the playlist is selected, a related content metadata group related to the selected content metadata in the first display area as a list.

* * * * *